United States Patent
El-Ali et al.

(10) Patent No.: US 12,455,890 B2
(45) Date of Patent: *Oct. 28, 2025

(54) SCALING BY DYNAMIC DISCOVERY FOR DATA PROCESSING

(71) Applicant: Capital One Services, LLC., McLean, VA (US)

(72) Inventors: Hala Salim El-Ali, Murphy, TX (US); Rajesh Ranjan Sinha, McKinney, TX (US); Raghavendra Dharmavaram, Little Elm, TX (US); Siddharth Srinivasan, Little Elm, TX (US); Vipin Dwivedi, Frisco, TX (US); Fredrick Allen Crable, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,704

(22) Filed: Jun. 18, 2024

(65) Prior Publication Data

US 2024/0338377 A1  Oct. 10, 2024

Related U.S. Application Data (63) Continuation of application No. 18/134,711, filed on Apr. 14, 2023, now Pat. No. 12,038,938, which is a
(Continued)

(51) Int. Cl.
 *G06F 16/2458* (2019.01)
 *G06F 16/27* (2019.01)
 (Continued)

(52) U.S. Cl.
 CPC ........ *G06F 16/2471* (2019.01); *G06F 16/278* (2019.01); *G06Q 10/087* (2013.01); *G06Q 30/0627* (2013.01); *G06Q 40/03* (2023.01)

(58) Field of Classification Search
 None
 See application file for complete search history.

(56) References Cited

U.S. PATENT DOCUMENTS

11,461,408 B1 * 10/2022 Bhushan ............. G06F 16/9038
2003/0050924 A1  3/2003 Faybishenko et al.
(Continued)

*Primary Examiner* — Giuseppi Giuliani
(74) *Attorney, Agent, or Firm* — Banner & Witcoff, Ltd.

(57) ABSTRACT

Aspects described herein may relate to methods, systems, and apparatuses that partitions searchable content and distributes the segments across a plurality of processing nodes, which in turn further sub-partitions the partitions for processing by local search actor in order to increase the speed with which a search request from a user is processed. Processing nodes available to receive partitioned searchable content are registered with an external storage device. The external storage device also maintains a global results collector that compiles results from the partitions of searchable content. Respective local collector actors receive compiled results from local search actors for a processing node and the compiled results are sent to the global results collector for compiling for the plurality of processing nodes. Results of the user search request are then provided to the user.

20 Claims, 7 Drawing Sheets

Related U.S. Application Data continuation of application No. 17/209,880, filed on Mar. 23, 2021, now Pat. No. 11,630,831, which is a continuation of application No. 16/848,230, filed on Apr. 14, 2020, now Pat. No. 10,984,009.

(60) Provisional application No. 62/865,143, filed on Jun. 21, 2019.

(51) Int. Cl.
*G06Q 10/087* (2023.01)
*G06Q 30/0601* (2023.01)
*G06Q 40/03* (2023.01)

(56) References Cited

U.S. PATENT DOCUMENTS

| | | |
|---|---|---|
| 2015/0074670 A1 | 3/2015 | Gerganov |
| 2016/0291940 A1* | 10/2016 | Searle .................. H04L 67/303 |
| 2017/0034040 A1 | 2/2017 | Pettovello |
| 2019/0272271 A1 | 9/2019 | Bhattacharjee et al. |
| 2020/0133550 A1* | 4/2020 | Willnauer ............. G06F 16/137 |

* cited by examiner

SCALING BY DYNAMIC DISCOVERY FOR DATA PROCESSING

CROSS REFERENCE TO RELATED APPLICATIONS

This is a continuation application of U.S. application Ser. No. 18/134,711, filed Apr. 14, 2023, which is a U.S. application Ser. No. 17/209,880, filed Mar. 23, 2021, which is a continuation of U.S. application Ser. No. 16/848,230, filed Apr. 14, 2020, (now U.S. Pat. No. 10,984,009, issued Apr. 20, 2021) which claims priority to provisional U.S. Application No. 62/865,143, filed Jun. 21, 2019, the disclosures of each of which are herein incorporated by reference in its entirety.

FIELD OF THE TECHNOLOGY

Aspects of the disclosure relate generally to managing search requests. More specifically, aspects of the disclosure may provide improved techniques for managing search requests across a plurality of computing devices.

BACKGROUND

The mass execution of analytical models across many dimensions of data to predict optimal transaction decisions for a large database of inventory is a computationally intensive and data intensive job that cannot be feasibly implemented in real-time on traditional computing systems. Moreover, the more negotiable parameters that are modified or added to a proposed transaction structure, the more exacerbated the shortcomings of existing decision making systems become.

In view of these and other shortcomings and problems with traditional decision making systems, improved systems and techniques for conducting mass execution of analytical models across many dimensions of voluminous data are desired in order to predict optimal transaction decisions in real-time.

SUMMARY

Techniques are desired, for example, to scale out business algorithm processing for a huge dataset (~4 million) within a few seconds. Aspects of the present disclosure concern processing of millions of records, such as 4 million records, at a given time. Aspects of the present disclosure include pre-filtering logic to reduce the initial data set if requested by a user. Processing of the records may be done in one multi-CPU (central processing unit) machine, for example, the Amazon Elastic Compute Cloud (EC2), with a distributed approach. Such an algorithm is written to distribute the processing to all available CPUs to maximize CPU usage. A central coordinator controls all distribution and at the end of successful processing collects all the results and presents the results to a client when requested. The central coordinator also stores the results for some time to support pagination at a server level so that clients need not implement additional processing for desired results. All the processing may be processed under 5 seconds and ideally under 2 seconds.

In existing systems, when there are N node clusters and a client's request lands on one node, only that node serves the traffic with all available CPUs while other nodes, which may not even be serving any traffic, cannot provide processing power for handling the request. Effectively, the cost of the total cluster is underutilized.

The present disclosure implements a distributed approach and data segmentation. An embodiment uses the Apache™ licensed Akka framework to provide basic thread management through its own actor system which also provides remoting and its own session management between actors. Aspects of the present disclosure utilize an approach of scalability in an on demand basis so that the system may be configured to provide required performance as and when needed, when data sets are going to change and business needs are changing.

For example, disclosed embodiments may use parallel computing and big data techniques to scale-out the execution of analytical models against many variations of input to produce a range of transaction outcomes for collateral with key values, such as each of a plurality of vehicles, with a corresponding vehicle identification number, in an inventory dataset aggregated across multiple vehicle dealers. These outcomes may then be analyzed against target decision outcomes to provide an optimal set of discreet decision possibilities customized for a particular customer and that customer's financial and credit risk.

Thus, the disclosed embodiments provide enhancements to decision making system technology, and address problems with traditional decision making systems unable to produce a similar range of tailored transaction outcomes, much less providing such outcomes in a timely fashion.

For ease of discussion, the present disclosure may describe embodiments in the context of a financial service provider providing pre-qualified vehicle loan offers in real-time in response to receiving customer data for a prequalification. Although other types of collateral with key values, beyond vehicles with vehicle identification numbers, also or alternatively may be utilized. The vehicle loan offers may be based on customer financial information and credit information and may include real-time pricing for each of a plurality of vehicles in an inventory of a plurality of dealers. It is to be understood, however, that disclosed embodiments are not limited to the vehicle loans, home loans, land loans, personal loans, lines of credit, sale of goods or services, etc. Rather, disclosed systems and techniques for mass execution of analytical models across multiple dimensions of data relevant to providing multi-dimensional pricing information in real-time may be employed to respond to any type of pricing platform involving variable terms, including terms dependent upon user specific qualifications. Indeed, disclosed embodiments are not limited to the financial service industry and, in fact, are not limited to any particular industry or field.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for on demand scaling of resources to provide for efficient processing of user search requests. According to some aspects of the disclosure, a client device sends a search request that includes one or more user specified criterion of content to be searched and a universally unique identifier (UUID) of the client device. A first processing node with a search service may be the recipient of such a user search request. The first processing node may access an external cache to obtain a list of a plurality of processing nodes that are registered with the external cache and available for assisting the first processing node in processing the search request. The first processing node then generates a global results collector to compile results received from the plurality of processing nodes and registers the global results collector with the external cache. The first processing node sends, to the global results collector, the UUID of the client device and a number representative of the number of partitions of the content to be searched. The first processing node further sends, to each of the plurality of processing nodes, a respective one of the number of partitions and reference data identifying the global results collector. Each respective processing node of the plurality generates a local collector actor to compile results received from local search actors, and each local actor, receives a number of sub-partitions and reference data identifying the global results coordinator. Each local search actor receives a respective one of the sub-partitions to process for search results and reference data of the local collector actor. When the global results collector has received all expected compiled result lists from each of the processing nodes, the global results collector sends a response to the search request including the expected compiled result lists from each of the processing nodes.

Based on methods and techniques described herein, content needing to be searched can be distributed across actors within an actor system for subsequent processing and compilation before results of the search are sent to a user. In this way, latency may be reduced and idle time for processing nodes may be reduced by, for example, distributing a search request across various search actors that are local to various processing nodes. The processing nodes handle partitioned content for a search request and provide results back to a global results collector. The global results collector ensures all expected result lists are received from the various processing nodes and then provides a complete final list to the user that initiated the search request. Additional examples of these aspects, and others, will be discussed below in connection with FIGS. 1-6.

Figure 1:
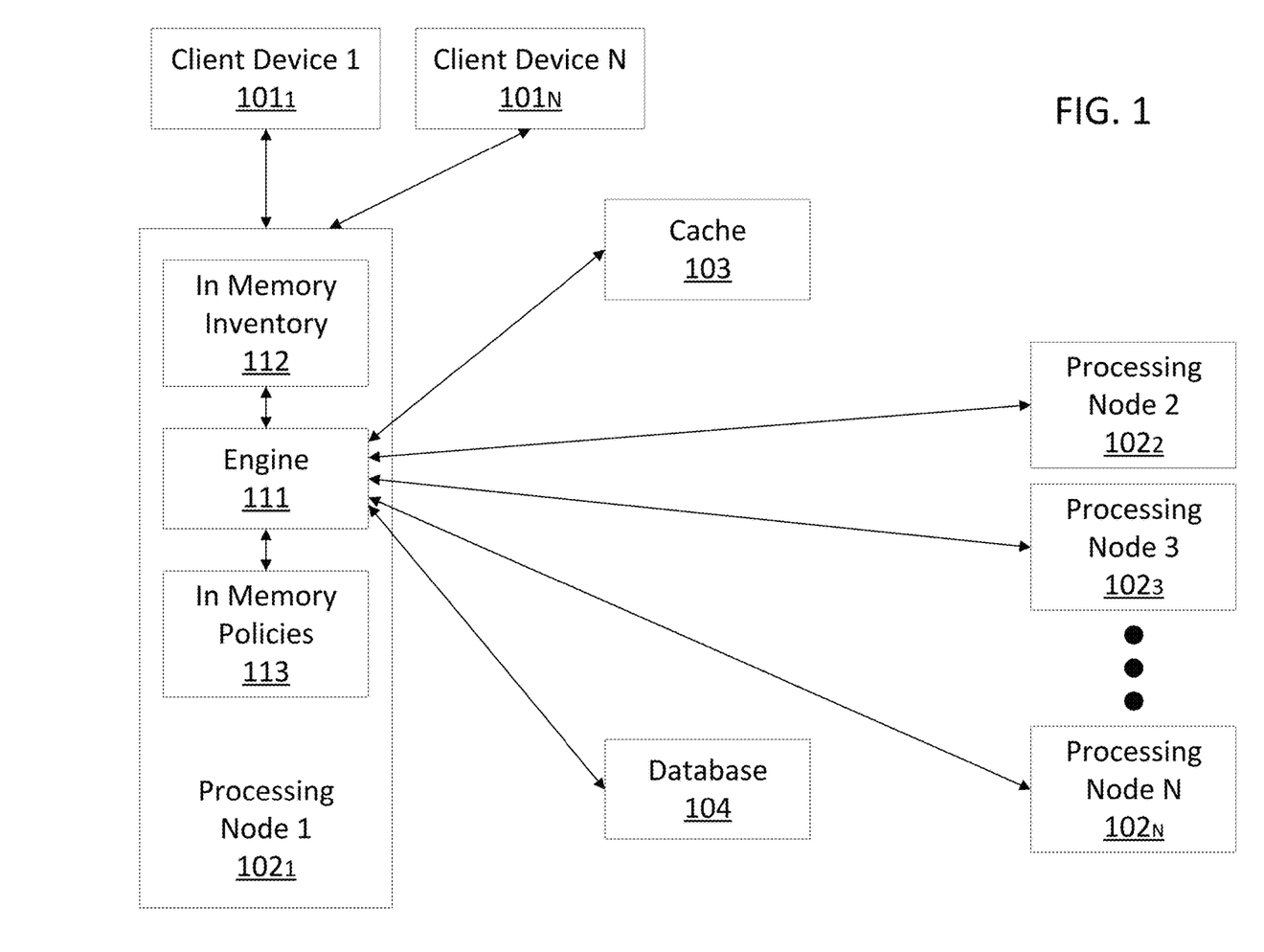
FIG. 1 depicts a block diagram of an example computing environment for scaling of computing resources for data processing.

FIG. 1 is a schematic diagram of an exemplary system environment for scaling of computing resources for data processing. In particular, FIG. 1 shows a diagram of an exemplary system 100, consistent with disclosed embodiments, revealing some technical aspects of the present disclosure for achieving the intended results of the present disclosure. Referring to FIG. 1, system 100 may include a plurality of client devices 101 (only one shown in FIG. 1), a plurality of processing nodes $102_1$, $102_2$, $102_3$-$102_N$, within a server cluster, at least one external storage device, such as cache 10,3 for registration and resource allocation (e.g., a Redis cache), and at least one standalone database 104 to maintain any data that is not accessible via the cache 103. The cache 103 is operatively connected to each of the N processing nodes $102_1$, $102_2$, $102_3$-$102_N$ and each processing node 102 is operatively connected to each of the other processing nodes via registration through the cache 103.

The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary. Client deices 101, processing nodes 102, cache 103, and standalone database 104 may include one or more processors, one or more memories, etc., and/or other components and/or subsystems not illustrated here.

In some embodiments, client device(s) 101 may be configured to receive input from a user, such as input regarding a request for prequalification and or a transaction proposal (e.g., one or more terms associated with a proposed loan application). Client device(s) 101 may execute an application to permit a user to search for content and obtain results of the search specific to the user's search request. For example, client device(s) 101 may execute a web browser application to present a web page through which a user may browse collateral inventory, such as vehicle inventory of a plurality of dealers and obtain real-time pricing information specific to the user for each or a subset of relevant vehicles in the inventory. Client devices 101 may send that inputted data to processing node $102_1$ for processing. In some embodiments, client device(s) 101 may be associated with an applicant for a vehicle loan. Additionally or alternatively, client device(s) 101 may be associated with an intermediary or point of sale, such as an automotive dealer. Client devices 101 may be connected to a network. In some embodiments, client devices 101 may be connected to a local network (e.g., a local network of an automotive dealer).

Such a network, in some embodiments, may comprise one or more interconnected wired or wireless data networks that receive data from one device (e.g., client device 101) and send it to another device (e.g., processing node $102_1$). For example, the network may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), or the like. Each component in system 100 may communicate bi-directionally with other system 100 components either through the network or through one or more direct communication links (not shown).

Each of processing nodes $102_1$-$102_N$ may be implemented using a variety of different equipment, such as one or more supercomputers, one or more personal computers, one or more servers, one or more mainframes or the like. In some embodiments, a processing node 102 may comprise hardware, software, and/or firmware modules. A processing node 102 may be configured to receive a prequalification request including customer information (e.g. monthly payment limits, loan amount, down payment amount, salary information etc.) to be used to score a plurality of vehicles in an inventory in real-time, coordinate parallel computing of analytical models against a plurality of vehicles in inventory and for potential variations of a transaction structure given the flexible transaction parameters, and score and rank the potential variations according to the preferences of those involved in the proposed transaction (e.g., a financial service provider, automotive dealer, and/or vehicle purchaser and loanee).

As shown in FIG. 1, each of processing nodes $102_1$-$102_N$ may include a pricing engine 111 configured to determine pricing for a specific type of vehicle in response to one or more criteria entered associated with the vehicle and the user requesting pricing on the same. Criteria may include the year of the vehicle, the make of the vehicle, the model of the vehicle, the number of miles on the vehicle, the exterior color of the vehicle, the interior color of the vehicle, the number of doors on the vehicle, the towing capacity of the vehicle, the mileage on the vehicle, whether the vehicle has been subject to an accident, whether the vehicle was subject to a smoker driver, and/or service record data for the vehicle. Pricing engine 111 is operatively connected to in memory inventory 112 and in memory policies 113. In memory inventory 112 may include a portion of vehicles or all vehicles available for potential acquisition across one or more vehicle dealerships and/or sellers. In the embodiments in which in memory inventory 112 includes all available vehicles that are for sale, and because each processing node 102 includes an in memory inventory 112, processing speed for accounting for potential financing offers per vehicle are increased since a processing node 102 need not access an external memory to identify applicable vehicle inventory information. Similarly, in memory policies 113 may include a portion of vehicle policies or all vehicle policies available for potential acquisition across one or more vehicle dealerships and/or sellers. In the embodiments in which in memory policies 113 includes all potential policies to offer against a variety of vehicles that are for sale, and because each processing node 102 includes an in memory policies 113, processing speed for accounting for potential financing offers per vehicle are increased since a processing node 102 need not access an external memory to identify applicable vehicle policy information.

For example, assume there is a total load to process 100,000 vehicles and the total processing nodes available is 10. The system would determine the total number of vehicles to process evenly across the number of available processing nodes, (100,000/10), to determine a total vehicle identification number (VIN) object list of 10,000 to be sent to each processing node to process and return the results to the request producer. Once a response has been received, a producer will organize the data in a requested format and store it in a temporary cache for pagination. This temporary data is stored with some time to live (TTL) settings so that the system may continue to flush any data which is not in use. With this approach, the processing power of the cluster may be increased by the Nth time (N is number of nodes), or in this example, by the $10^{th}$ time.

The processing node $102_1$ also may generate a global results collector for each of the other processing nodes $102_2$-$102_N$ to submit results. The new global results collector may be provided with a universally unique identifier (UUID) and a number of VIN partitions as part of the search. With receipt of the number of partitions, the global results collector may know the total number of expected results it should receive from other processing nodes. Upon creation of the global results collector, the processing node $102_1$ may send the filter and price to each of the other processing nodes that is part of the partitioned search. This filter and price data includes the UUID, a partition of VINs for the particular processing node, and the global results collector reference data in order for the respective processing node to return results.

For each processing node that has been partitioned a portion of the VINs for searching, a local coordinator actor may receive the filter and price data from the vehicle search service of the processing node, such as processing node $102_1$, described herein. The local coordinator actor may partition the VINs and create a local collector actor and pass along the number of local VIN partitions and the global results collector reference data of the processing node $102_1$. Accordingly, once completion of the search occurs, the respective processing node 102, such as processing nodes $102_2$-$102_N$, knows where to send the results to, the global results collector of the processing node $102_1$. The local coordinator actor for each processing node 102 sends the filter and price data (including the local VIN partition and local collector reference data) to one or more vehicle search actors, e.g. thread as part of the Akka actor system.

The vehicle search actors search results and provide results back to the local collector actor. The local search actor then confirms that all searches with results are complete. Then the local coordinator actor sends the results back to the global results collector of the original processing node $102_1$. The global results collector then checks to ensure all processing nodes have submitted results back to the global results collector.

Figure 2:
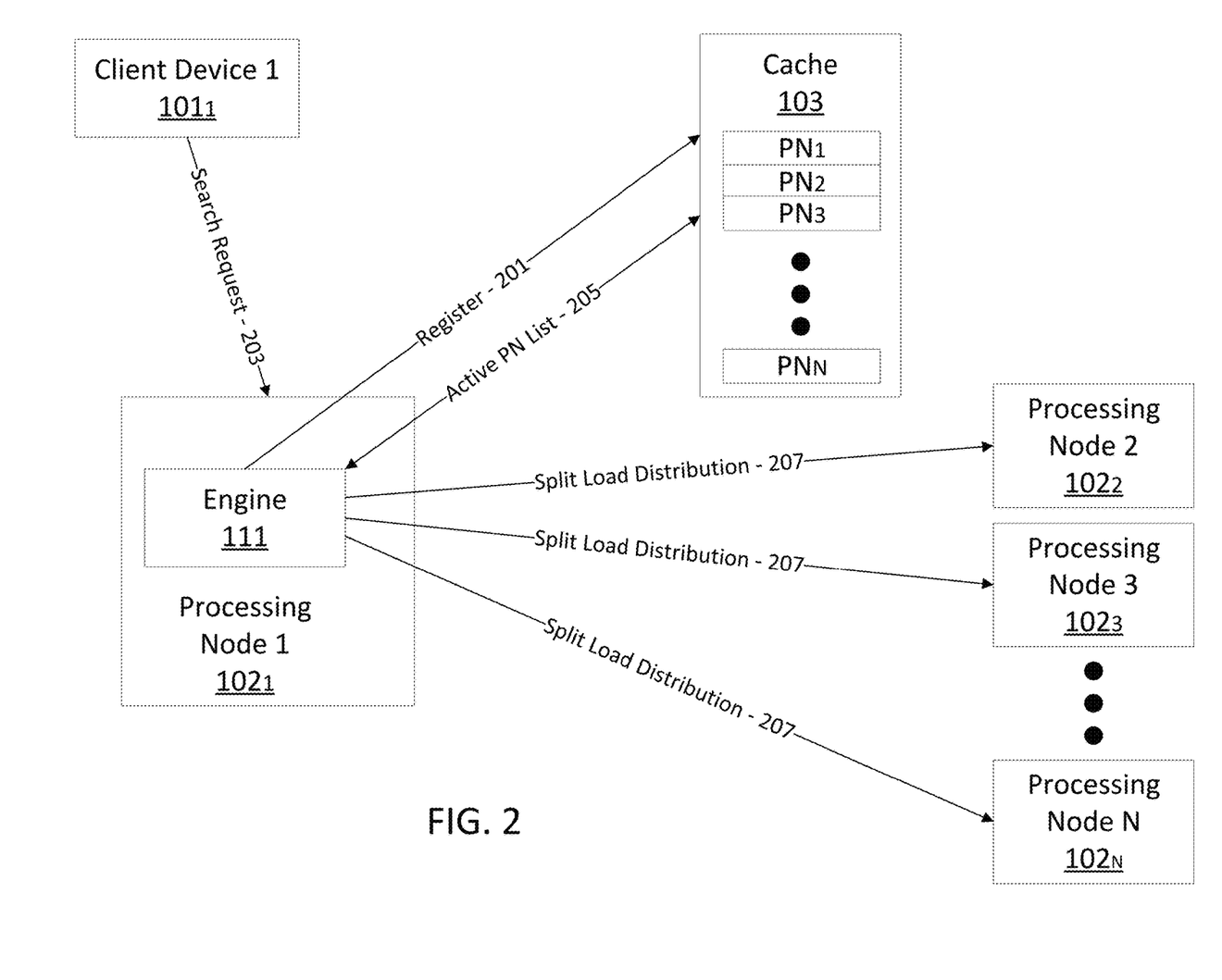
FIG. 2 depicts a schematic diagram of an exemplary system environment for processing node registration in accordance with one or more features of the present disclosure.

FIG. 2 is a schematic diagram of an exemplary system environment for processing node registration in accordance with one or more features of the present disclosure. Similar features of FIG. 1 are included in FIG. 2 while illustrative communications between devices are shown. Initially, when a processing node is initiated (e.g., added to) within a system, a unique Internet protocol (IP) address may be assigned to the processing node, just like any other processing node inside the system. Processing nodes within a cluster are at least one processing node and have an upper limit decided by the infrastructure of the system. After initialization of the processing node, a pattern of self-registration of its IP address on some common location is implemented. As shown in FIG. 2, engine 111 of processing node 1 $101_1$ may utilize a cache as a common registering service. The common registering service may be any of a number of services, including a Redis cache, a database, Amazon Simple Storage Service (S3), or any system which should be accessible to an application cluster. Cache 103 may maintain a list of all active processing nodes 102 within a cluster, where the list is based upon those processing nodes 102 that registered, such as via a communication 201. Accordingly, processing node 1 $102_1$, processing node 2 $102_2$, processing node 3

$102_3$, and through processing node N $102_N$ are shown as registered within cache 103 in FIG. 2.

At some point a processing node may receive a search request from a client device. FIG. 2 shows client device 1 $101_1$ sending a search request to processing node 1 $101_1$ where the search request 203 is received. On receiving of a request, an application of the processing node 1 $102_1$ initially may run some validation on the search request. Upon successful verification, processing node 1 $102_1$ may request and receive a list of active processing nodes of the cluster based upon available IPs from the cache 103. This request and subsequent response communication is shown by communication link 205 in FIG. 2. Upon receipt of the active processing node list in communication 205, processing node 1 $102_1$ may determine the total processing nodes available on a cluster for distribution of the load for the search by splitting among the available processing nodes. After determining the number of processing nodes available for processing, processing node 1 $102_1$ may divide the total load evenly between all the available processing nodes and then may send a processing request through Akka remoting, as one example, using specific IPs to each respective processing node. In FIG. 2, split load distribution communication 207 is shown as the split of the load for the search request among processing node 2 $102_2$, processing node 3 $102_3$, and through processing node N $102_N$. Accordingly, the processing load for the search request 203 may be split between the available processing nodes received in the active processing node list 205 in addition to processing node 1 $102_1$. In still other configurations, the processing load for the search request 203 may be split between the available processing nodes received in the active processing node list 205 while processing node 1 $102_1$ is not utilized for processing the search request. Accordingly, processing node 1 $102_1$ may split the search request between the available processing nodes received in the active processing node list 205 in addition to processing node 1 $102_1$ evenly, or may split the search request between the available processing nodes received in the active processing node list 205 in addition to processing node 1 $102_1$ based upon some other manner, e.g., load balancing, criteria for use, etc.

Figure 3:
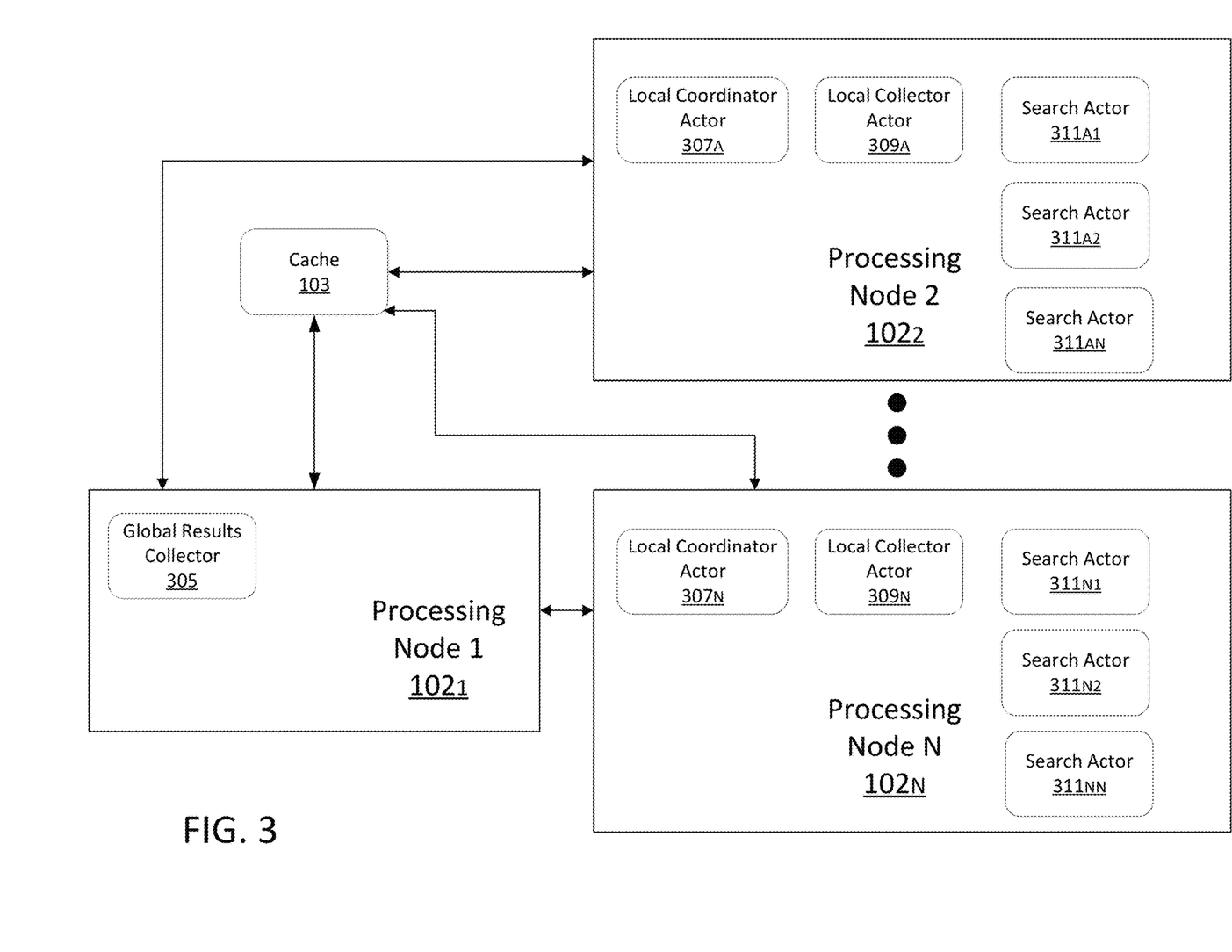
FIG. 3 depicts a block diagram of interactions between various entities in a data processing system of the present disclosure.

FIG. 3 illustrates a block diagram of interactions between various entities in a data processing system of the present disclosure. FIG. 3 shows an example of a search operation being performed. Such a search operation may be to search for a vehicle for potential acquisition by a user of the data processing system. A user may be at a client device, such as client device $101_1$ in FIG. 1 (not shown in FIG. 3). The user may use her client device $101_1$ to access a vehicle search service. When accessing a vehicle search service, client device $101_1$ may send a universally unique identifier (UUID) search to the vehicle search service.

The vehicle search service may be part of a processing node, such as processing node 1 $102_1$ shown in FIG. 3. After receiving the search request with the UUID, the vehicle search service may determine available processing nodes via a cache, such as cache 103. Available processing nodes that have registered with the cache 103 are provided to the processing node 1 $102_1$, which may be in the form of a list of available processing nodes. In this example, a number of processing node 2 $102_2$ through processing node N $102_N$ may have previously registered with cache 103, such as described above with respect to FIGS. 1 and 2.

The vehicle search service that is part of processing node 1 $102_1$ may determine for a requested search for vehicle identification numbers (VINs) results that match one or more criterion of a user in the requested vehicle search. The vehicle search service may provide the one or more criterion to allow a user to select from. Examples of a criterion include make of a vehicle, model of a vehicle, color of a vehicle, model year of a vehicle, geographic location of a vehicle (e.g., distance from the user's location), and any of a variety of other criterion. With the list of available processing nodes 2 $102_2$ through N $102_N$, processing node 1 $102_1$ may distribute the search to the available processing nodes by partitioning the VINs for determining matches. Because each of the available processing nodes is registered with cache 103, the processing node $102_1$ partitions the VINs for searching to determine an applicable result to present to the user based upon the one or more criterion of the user.

As part of the vehicle search, processing node 1 $102_1$ may generate a global results collector 305 for each of the other processing nodes $102_2$-$102_N$ to use in order to submit results of their respective searches. Global results collector 305 may be provided with the UUID of the client device $101_1$ requesting the search in addition to the number of VIN partitions as part of the search. With receipt of the number of partitions, the global results collector 305 knows the total number of expected results it should receive from the processing nodes. For example, if the number of VIN partitions is eight, global results collector 305 expects to receive a total of eight sets of results, one for each VIN partition. In one example, the eight results may be received from eight different processing nodes 102 among processing nodes 2 $102_2$ through N $102_N$. In another example, the eight results may be received from seven different processing nodes 102 among processing nodes 2 $102_2$ through N $102_N$ and one from processing node 1 $102_1$. Upon creation of global results collector 305, processing node 1 $102_1$ may send the UUID, a respective VIN partition, and reference data of global results collector 305 to each of the other processing nodes 2 $102_2$ through N $102_N$ that is part of the partitioned search. The reference data of global results collector 305 may be utilized by the respective processing node 102 to return results of its search back to global results collector 305.

As shown in FIG. 3, each processing node, processing node 2 $102_2$ through processing node N $102_N$, that has been partitioned a portion of the VINs for searching may include a local coordinator actor 307 configured to receive the UUID, the respective VIN partition, and reference data of global results collector 305 from the vehicle search service of the processing node, such as processing node 1 $102_1$, described herein. Processing node 2 $102_2$ includes local coordinator actor $307_A$ and processing node N $102_N$ includes local coordinator actor $307_N$. The respective local coordinator actor 307 may further partition the received VINs for searching among a plurality of respective search actors 311, e.g. thread as part of an Akka actor system. The respective local coordinator actor 307 also may create a local collector actor 309. Processing node 2 $102_2$ includes local collector actor $309_A$ and one or more search actors $311_{A1}$ through $311_{AN}$ and processing node N $102_N$ includes local collector actor $309_N$ and one or more search actors $311_{N1}$ through $311_{NN}$.

As shown in FIG. 3, processing node 2 $102_2$ may generate local collector actor $309_A$ and processing node$_N$ $102_N$ may generate local collector actor $309_N$ to use in order to submit results of their respective searches back to global results collector 305. Local collector actor 309 may be provided with the number of VIN partitions as part of the search in addition to reference data of global results coordinator 305. With receipt of the number of partitions, local collector actor 309 knows the total number of expected results it should receive from the respective one or more search actors. Accordingly, local coordinator actor $307_A$ may partition the VINs received by processing node 2 $102_2$ into four VIN partitions. Local collector actor $309_A$ then expects to receive four different results back, one from each of the search actors $311_{A1}$ through $311_{A4}$. Upon creation of local collection actor $309_A$, local coordinator actor $307_A$ may send the respective VIN partition and reference data of local collector $309_A$ to each of the respective search actors $311_{A1}$ through $311_{A4}$ that is part of the partitioned search. The reference data of local collector actor $309_A$ may be utilized by the respective search actor 311A to return results of its search back to local collector actor $309_A$. Each of the other respective processing nodes 102 may each include applicable local coordinator actor 307, such as local coordinator $307_N$, local collection actor 309, such as local collection actor $309_N$, and one or more search actors 311, such as search actors $311_{N1}$ through $311_{NN}$. Each of these local coordinator actors 307, local collection actors 309, and one or more search actors 311 may operate and a similar manner as described herein for local coordinator actors $307_A$, local collection actors $309_A$, and one or more search actors $311_{A1}$ through $311_{AN}$.

Upon completion of the search by a respective search actor 311, such as search actor $311_{A1}$, the respective search actor 311 knows where to send the results to, the local collector actor $309_A$ of the processing node 2 $102_2$. The respective search actors 311 search for vehicle results and provides the results back to the respective local collector actor 309. Thus, search actors $311_{A1}$ through $311_{AN}$ provide search results to local collection actor $309_A$ of processing node 2 $102_2$ and search actors $311_{N1}$ through $311_{NN}$ provide search results to local collection actor $309_N$ of processing node N $102_N$. The local search actor then confirms that all searches with results are complete. Then the local coordinator actor sends the results back to the global results collector of the original processing node $102_1$. The global results collector then checks to ensure all processing nodes have submitted results back to the global results collector.

Figure 4:
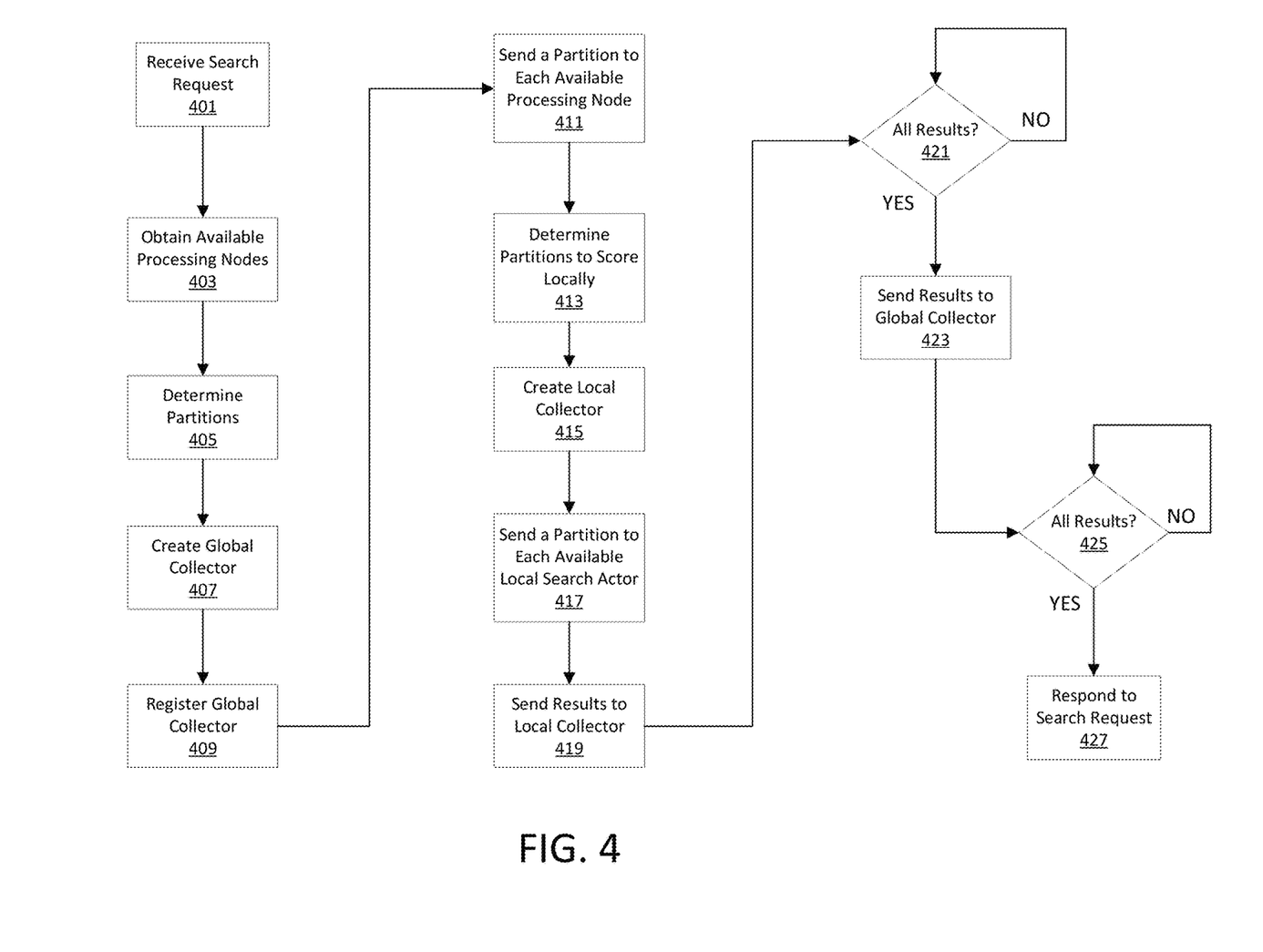
FIG. 4 depicts an example method for searching for vehicles with a data processing system.

FIG. 4 depicts an example method for searching for vehicles with a data processing system. The method described in FIG. 4 may be a method performed by one or more elements described herein with respect to FIGS. 1-3. The method starts with a search request received at step 401 by a first processing node. The first processing node may be processing node 1 $102_1$ shown in FIG. 3. As described herein the first processing node may include a search service, such as a vehicle search service, which allows a user to search for one or more vehicles that meet one or more criterion specified by the user. The one or more criterion may be any of a number of criterion including geographical location. As part of the search request, a UUID of the client device of the user may be received, such as client device $101_1$ in FIG. 1.

Moving to step 403, the first processing node obtains a list of other processing nodes which are available for assisting in the search request. The first processing node may obtain such a list from a storage device, such as cache 103 in FIG. 3. In one example as follows for illustrative purposes, the list of processing nodes available for assisting in the search request may be seven processing nodes. Proceeding to step 405, the first processing node may partition the VINs for the search request across the seven processing nodes. In other examples the first processing node may partition the VINs across the seven processing nodes and the first processing node. The first processing node may determine the partitions by taking the total number of VINs for the search and dividing by the total number of processing nodes involved in the search. Accordingly, for a search of 800,000 VINs, the first processing node may partition the VINs into eight groups of 100,000 VINs.

Proceeding to step 407, the first processing node also may generate a global results collector that is configured to receive results from the processing nodes of the partitioned VINs. The global results collector may be global results collector 305 from FIG. 3 and may be used to maintain the results in memory. The first processing node may register the global results collector in step 409. Registration of the global results collector may be by the first processing node registering with a cache, such as cache 103 from FIG. 3. The global results collector may be provided with the UUID of the client device requesting the search in addition to the number of VIN partitions, in this example eight, as part of the search. With receipt of the number of partitions, eight, the global results collector knows the total number of expected results, eight, it should receive from the respective processing nodes involved in the search of the VINs.

In step 411, the first processing node may send the UUID of the client device, a respective VIN partition, and reference data of the global results collector to each of the processing nodes that is part of the partitioned search. In this example, the first processing node may send the UUID, a respective VIN partition, and the reference data of the global results collector to the seven other processing nodes assisting in the search. Within each of the processing nodes, the local coordinator actor, such as local coordinator actor 307 in FIG. 3, may receive, from the first processing node, the UUID, the respective VIN partition, and the reference data of the global results collector. In step 413, upon receipt of the UUID, a respective VIN partition, and the reference data of the global results collector, the respective local coordinator actor may further sub-partition the VINs for the search request across multiple search actors, such as search actors $311_{A1}$ through $311_{AN}$ in FIG. 3. The local coordinator actor may determine the sub-partitions by taking the total number of VINs for the search, in this example 100,000 VINs, and dividing by the total number of search actors available in respective processing node. Accordingly, for a search of 100,000 VINs at a processing node having ten search actors, the local coordinator actor may sub-partition the VINS into ten groups of 10,000 VINS.

Proceeding to step 415, the respective processing node may generate a local collector actor, such as local collector actor $309_A$ in FIG. 3, to use in order to submit results from the respective search actor back to the global results collector. The local collector actor may be provided with the number of VIN sub-partitions as part of the local search, is this example ten, in addition to reference data of the global results coordinator since the results accumulated by the local collector actor will be sent to the global results collector. The local collector actor may be configured to compile the results from each of the respective local search actors to send back to the global results collector.

Moving to step 417, the local coordinator actor may send the respective VIN sub-partition from step 413, and reference data of the local collector actor to each of the respective search actors. In this example, the local coordinator actor may send the respective VIN sub-partition from step 413 (a total of 10,000 VINs) and the reference data of the local collector actor to the ten search actors assisting in the search. The local search actors then perform their search of their respective VINs in order to obtain a result list. In step 419, each respective local search actor sends its result list of the search back to the local collector actor. The results may be those VINs that met the one or more criterion that the user included in her search request.

As described in this example, the local collector actor expects to receive a total of ten results, one from each of the respective local search actors. In step 421, the local collector actor may determine whether it has received all of the expected results from each of the respective search actors. If not, the process returns to step 421 until all results have been received. Once all results have been received by the local collector actor in step 421, the process moves to step 423 where the compiled results are sent from the local collector actor to the global results collector. The local collector actor knows where to send the results to since the local collector actor received reference data for the global results collector from the first processing node in step 411.

As noted for the example of FIG. 4, the global results collector expects to receive a total of eight results, one from each of the respective processing nodes involved in the search. In step 425, the global results collector may determine whether it has received all of the expected results from each of the respective processing nodes. If not, the process returns to step 425 until all results have been received by the global results collector. Once all results have been received by the global results collector in step 425, the process moves to step 427 where the compiled results are sent from the global results collector to the user at the client device as part of a result listing. The global results collector knows where to send the results to since the global results collector received the UUID of the client device as part of step 407.

Figure 5A:
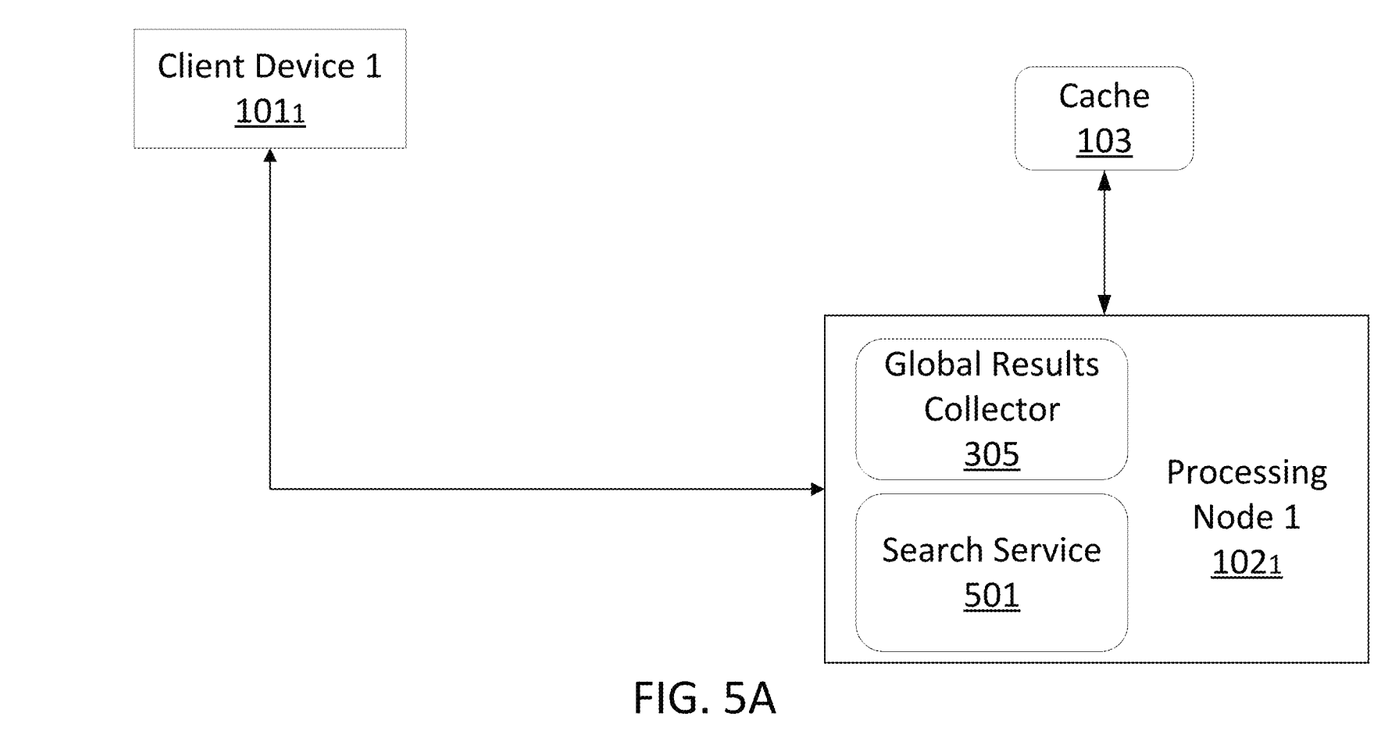
FIGS. 5A and 5B illustrate block diagrams of a user receiving results of a search request put into a data processing system of the present disclosure.
Figure 5B:
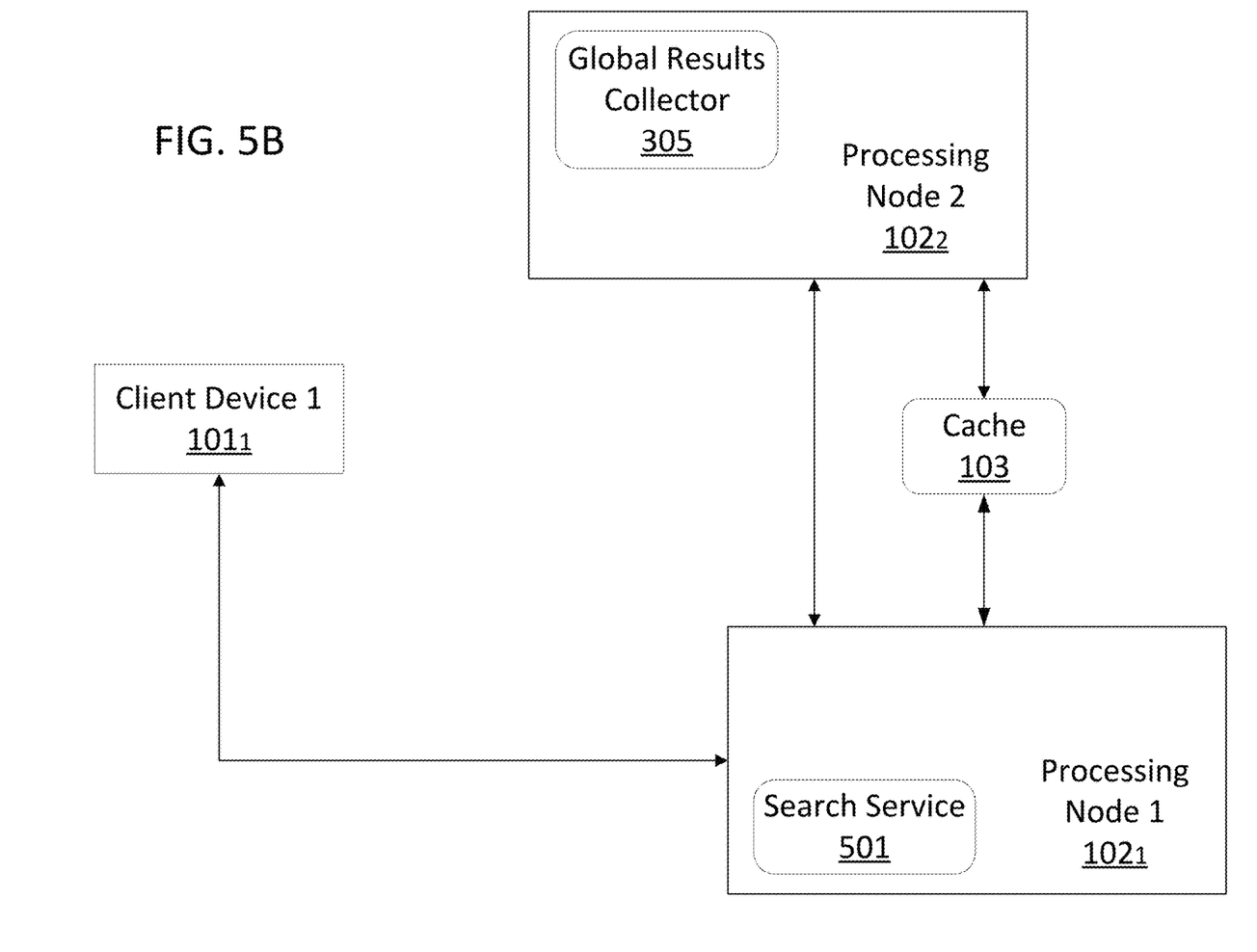

FIGS. 5A and 5B illustrate block diagrams of a user receiving results of a search request put into a data processing system of the present disclosure. As shown in FIG. 5A, a client device $101_1$ is shown connected, via communication path, to processing node 1 $102_1$. This communication path is shown as a bi-directional path allowing for a search request to be initiated by a user at client device 1 $101_1$ and allowing for results of the search request to be received by the client device 1 $101_1$. Processing node 1 $102_1$ is shown connected, via a communication path, to cache 103. This communication path also is shown as a bi-directional path allowing for the processing node 1 $101_1$ to provide data to and request data from cache 103 and allowing for cache 103 to receive data from and provide data to processing node 1 $101_1$. In FIG. 5A, processing node 1 $102_1$ is shown to include global results collector 305, such as described in FIG. 3. Processing node 1 $102_1$ also includes a search service 501. Search service 501 may determine for a requested search for VINs results that match one or more criterion of a user in the requested vehicle search.

FIG. 5B is similar to FIG. 5A but for the difference that global results collector 305 is shown within a different processing node from the processing node that client device 1 $101_1$ access the search service 501. In FIG. 5B, a user at client device 1 $101_1$ may access search service 501 as part of processing node 1 $102_1$, similar to what is shown in FIG. 5A. However, in FIG. 5B, the global results collector 305 is shown within processing node 2 $102_2$. Global results collector 305 may operate in the same manner as described in FIGS. 3 and 5A; however, the location of the global results collector 305 is different.

Figure 6:
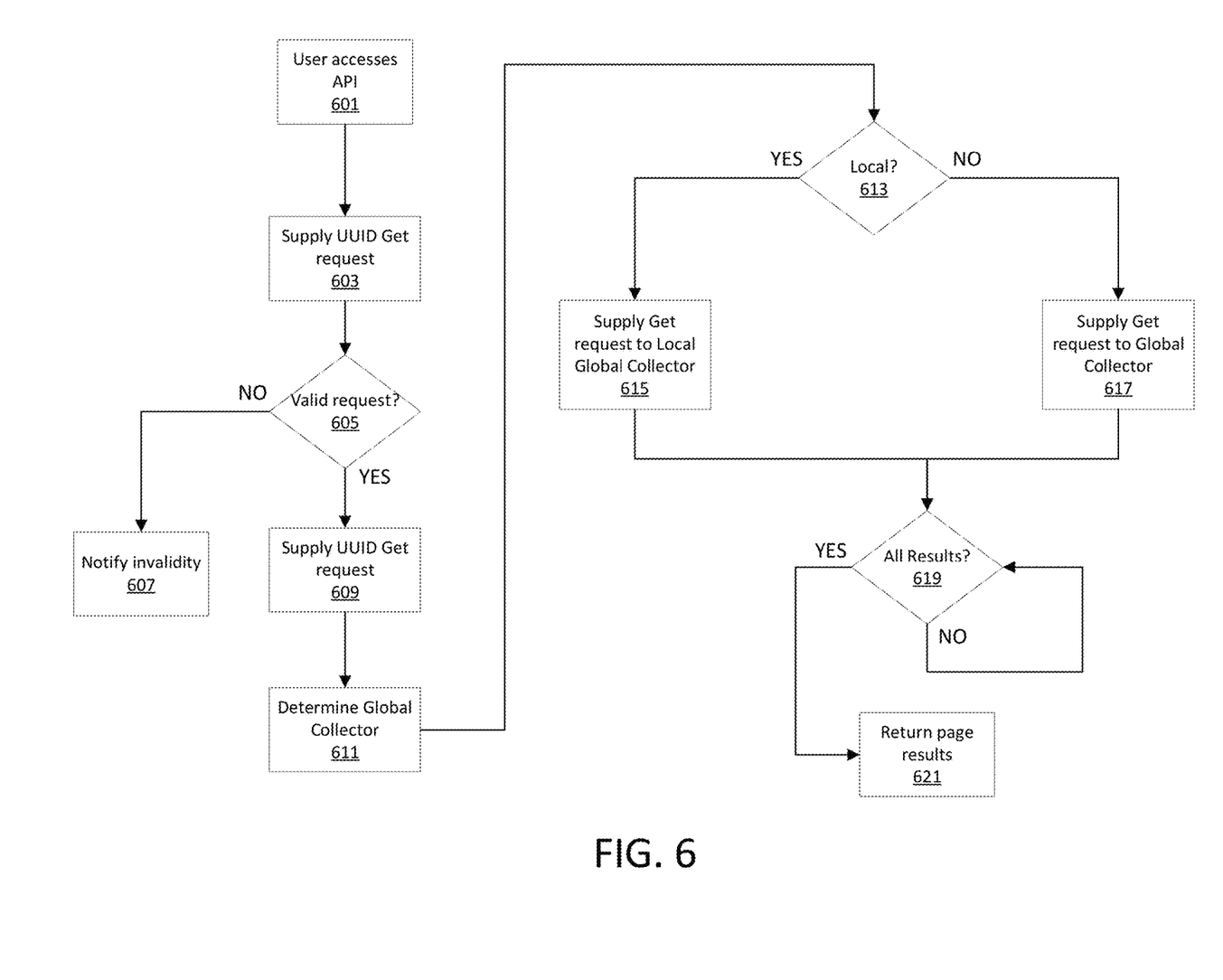
FIG. 6 depicts an example method receiving results of a search request put into a data processing system of the present disclosure.

FIG. 6 depicts an example method receiving results of a search request put into a data processing system of the present disclosure. The method described in FIG. 6 may be a method performed by one or more elements described herein with respect to FIGS. 1-5B. The method starts at step 601 with a user accessing an application programming interface (API), such as a rapid representational state transfer (REST) API. Moving to step 603, a client device, such as client device 1 $101_1$, supplies a UUID Get page search command. This command is used to get a resource from a server. Upon receipt of a Get page search command, the recipient looks for the data that is requested and sends it back as a response.

Proceeding to step 605, a determination may be made as to whether the request is a valid request. If the request is determined to not be valid, a user may be notified of the invalidity of the request in step 607. But if the rapid rest API validates the request in step 605, the process moves to step 609 where the rapid rest API sends the UUID Get page search command to a vehicle search service, such as the search service 501 within processing node 1 $102_1$ discussed in FIGS. 1-5B. Proceeding to step 611, the vehicle search service may determine the global results collector by the UUID. The vehicle search service may access a cache, such as the cache 103 in FIGS. 5A and 5B. The cache may be configured to maintain reference data of the global results collector, including the location of the global results collector. The cache further may be configured to maintain available processing nodes that may be utilized in a data processing search, such as for a vehicle search request. Having determined the available processing nodes, the vehicle search service may request the available VINs meeting the one or more user criterion from the global results collector included within the processing node, such as processing node 1 $102_1$ in FIGS. 1-5B.

In step 613, a determination may be made as to whether the global results collector determined in step 611 is local to the processing node that received the request for a results page. If the global results collector is local to the processing node that received the original user request, the process moves to step 615 where the Get page search request may be supplied to the local global results collector. FIG. 5A illustrates an illustrative example of the global results collector being local to the processing node 1 $102_1$ that received the user search request. The process then proceeds to step 619.

If the global results collector is not local to the processing node that received the original user request, the process moves to step 617 where the Get page search request may be supplied to the global results collector that is on a different processing node from the processing node that received the original user search request. FIG. 5B illustrates an illustrative example of the global results collector being on a different processing node 2 $102_2$ from the processing node 1 $102_1$ that received the user search request. The process then proceeds to step 619.

In step 619, a determination may be made as to whether all results for the search request have been received from the various processing nodes involved in the search request. If all results have not yet been received, the process may return to step 619. In such a case, a response may be sent back to the user where the response indicates an incomplete result. Thereafter a user may then access the API again to retrieve the results when all results have been received as part of step 621. Thus, when all results have been received, the process moves to step 621 where a page and summary may be sent from the global results collector to the vehicle search service. Vehicle details may be determined by the vehicle search service and the page and summary and vehicle details then may be provided to the rapid rest API and subsequently to the original requesting client device.

One or more aspects discussed herein may be embodied in computer-usable or readable data and/or computer-executable instructions, such as in one or more program modules, executed by one or more computing devices or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

We claim:

1. A method comprising:
    receiving, by a global results collector in a first computing device, a universally unique identifier (UUID) of a third computing device, different from the first computing device and at least two second computing devices, requesting a search of content and a number of partitions of the content to be searched, wherein the global results collector is configured to compile results received from the at least two second computing devices;
    sending, to each of the at least two second computing devices, a respective one of the number of partitions and reference data of the global results collector;
    receiving, by the global results collector from each of the at least two second computing devices, an expected compiled result list comprising data representative of an inventory of items matching at least one user specified criterion of the content to be searched;
    determining, by the first processing device, at least one financing offer for at least one item of the inventory of items; and
    sending, by the first computing device to the third computing device, a response to the search of content, wherein the response comprises results including the expected compiled result list from each of the at least two second computing devices and the determined at least one financing offer.

2. The method of claim 1, further comprising registering the global results collector with an external storage device maintaining a list of the at least two second computing devices available for assisting in processing the search of content.

3. The method of claim 1, wherein the response comprises results matching a criterion associated with a user.

4. The method of claim 1, wherein the global results collector further is configured to compile results received from a local collector actor in the first computing device.

5. The method of claim 1, wherein the content to be searched comprises vehicle identification numbers (VINs).

6. The method of claim 5, wherein the response comprises VINs matching the at least one user specified criterion of the content to be searched.

7. The method of claim 1, wherein the number of partitions is based upon the user specified criterion.

8. The method of claim 1, further comprising, accessing, by the first computing device, an internal memory maintaining the financing offers associated with each item in the inventory of items.

9. The method of claim 1, further comprising, accessing, by the first computing device, an external memory maintaining the financing offers associated with each item in the inventory of items.

10. The method of claim 1, wherein the determining comprises determining financing offers for each item of the inventory of items.

11. A first computing device comprising:
    one or more memories; and
    one or more processors communicatively coupled to the one or more memories, configured to:
        receive, by a global results collector in the first computing device, a universally unique identifier (UUID) of a third computing device, different from the first computing device and at least two second computing devices, requesting a search of content and a number of partitions of the content to be searched, wherein the global results collector is configured to compile results received from the at least two second computing devices;

send, to each of the at least two second computing devices, a respective one of the number of partitions and reference data of the global results collector;

receive, by the global results collector from each of the at least two second computing devices, an expected compiled result list comprising data representative of an inventory of items matching at least one user specified criterion of the content to be searched;

determine at least one financing offer for at least one item of the inventory of items; and send, to the third computing device, a response to the search of content, wherein the response comprises results including the expected compiled result list from each of the at least two second computing devices and the determined at least one financing offer.

12. The first computing device of claim 11, wherein the one or more processors, are further configured to register the global results collector with an external storage device maintaining a list of the at least two second computing devices available for assisting in processing the search of content.

13. The first computing device of claim 11, wherein the global results collector further is configured to compile results received from a local collector actor in the first computing device.

14. The first computing device of claim 11, wherein the response comprises VINs matching the at least one user specified criterion of the content to be searched.

15. The first computing device of claim 11, further comprising an internal memory maintaining the financing offers associated with each item in the inventory of items, wherein the one or more processors, are further configured access the internal memory to obtain data representative of the financing offers.

16. The first computing device of claim 11, wherein the determine comprises determine financing offers for each item of the inventory of items.

17. A non-transitory computer readable medium storing instructions, that, when executed by one or more processors, cause a first computing device to:

receive, by a global results collector in the first computing device, a universally unique identifier (UUID) of a third computing device, different from the first computing device and at least two second computing devices, requesting a search of content and a number of partitions of the content to be searched, wherein the global results collector is configured to compile results received from the at least two second computing devices;

send, to each of the at least two second computing devices, a respective one of the number of partitions and reference data of the global results collector;

receive, by the global results collector from each of the at least two second computing devices, an expected compiled result list comprising data representative of an inventory of items matching at least one user specified criterion of the content to be searched;

determine at least one financing offer for at least one item of the inventory of items; and send, to the third computing device, a response to the search of content, wherein the response comprises results including the expected compiled result list from each of the at least two second computing devices and the determined financing offer.

18. The non-transitory computer readable medium of claim 17, wherein the response comprises VINs matching the at least one user specified criterion of the content to be searched.

19. The non-transitory computer readable medium of claim 17, wherein the instructions, when executed by the one or more processors, further cause the first computing device to access an internal memory of the first computing device to obtain data representative of the financing offers associated with each item in the inventory of items.

20. The non-transitory computer readable medium of claim 17, wherein the determine comprises determine financing offers for each item of the inventory of items.

* * * * *